United States Patent [19]

Blake

[11] 4,427,309
[45] Jan. 24, 1984

[54] TURBOCHARGER SHAFT BEARING

[75] Inventor: James E. T. Blake, Manhattan Beach, Calif.

[73] Assignee: The Garrett Corporation, Los Angeles, Calif.

[21] Appl. No.: 345,493

[22] Filed: Feb. 3, 1982

Related U.S. Application Data

[63] Continuation of Ser. No. 133,008, Mar. 24, 1980, abandoned.

[51] Int. Cl.$^3$ ................ F16C 33/10; F16C 27/02; F16C 17/18
[52] U.S. Cl. ................ 384/286; 384/99; 384/287; 384/398; 308/DIG. 4
[58] Field of Search ............ 308/DIG. 4, DIG. 15; 384/287, 114, 99, 100, 129, 103, 118, 111, 107, 384/286, 399, 398; 415/110, 142, 170 R

[56] References Cited

U.S. PATENT DOCUMENTS

| | | |
|---|---|---|
| 98,172 | 12/1869 | Lloyd . |
| 421,089 | 2/1890 | Wood . |
| 1,376,094 | 4/1921 | Holtorp . |
| 1,397,050 | 11/1921 | Holtorp . |
| 1,495,660 | 5/1924 | Ziegler . |
| 2,566,080 | 8/1951 | Davids .................... 308/DIG. 4 |
| 2,578,712 | 12/1951 | Martelotti . |
| 2,860,827 | 11/1958 | Egli . |
| 2,953,416 | 9/1960 | Collins et al. . |
| 3,043,636 | 7/1962 | MacInnes ................ 384/287 |
| 3,058,787 | 10/1962 | Bernson ................ 308/DIG. 4 |
| 3,167,362 | 7/1962 | Dschen . |
| 3,365,958 | 1/1968 | Bard et al. . |
| 3,680,932 | 8/1972 | Raimondi . |
| 3,722,965 | 3/1973 | Gemein et al. . |
| 3,941,437 | 3/1976 | MacInnes et al. . |
| 3,993,370 | 11/1976 | Woollenweber . |
| 4,009,972 | 3/1977 | Sarle . |
| 4,037,889 | 7/1977 | Platt . |
| 4,047,772 | 9/1977 | Goloff . |
| 4,076,342 | 2/1978 | Thorpe . |
| 4,090,743 | 5/1978 | Suzuki et al. ................ 384/13 |
| 4,119,375 | 10/1978 | Kirk et al. . |
| 4,120,544 | 10/1978 | Hüber . |

FOREIGN PATENT DOCUMENTS

| | | |
|---|---|---|
| 514555 | 11/1920 | France . |
| 1151897 | 2/1958 | France . |
| 1275662 | 10/1961 | France . |
| 2145968 | 1/1973 | France . |
| 2226033 | 10/1974 | France . |
| 351144 | 12/1960 | Switzerland . |
| 871001 | 12/1956 | United Kingdom . |

OTHER PUBLICATIONS

French Magazine "La Technique Moderne" T. 611, #4, p. 214.

*Primary Examiner*—Stuart S. Levy
*Assistant Examiner*—Thomas R. Hannon
*Attorney, Agent, or Firm*—Stuart O. Lowry; Albert J. Miller

[57] ABSTRACT

A bearing for supporting a turbocharger shaft comprises a one-piece cylindrical bearing sleeve for rotational floating between a turbocharger housing and shaft. The bearing includes an inner diameter configured to define a plurality of axially extending arcuate lands formed on a common radius and separated by oil-receiving recesses.

11 Claims, 3 Drawing Figures

TURBOCHARGER SHAFT BEARING

This is a continuation of application Ser. No. 133,008 filed Mar. 24, 1980 now abandoned.

BACKGROUND OF THE INVENTION

This invention relates to an improved bearing arrangement for supporting high speed rotating shafts. More specifically, this invention relates to a specific bearing configuration designed for use in turbochargers.

In a turbocharger, a turbine wheel and a compressor impeller are carried on a common shaft. The turbine wheel is received within a turbine housing for communication with exhaust gases from an engine, whereby the shaft is rotatably driven during engine operation. The shaft is supported by suitable journal bearings and thrust bearings within a center housing connected between the turbine housing and a compressor housing receiving the compressor impeller. The exhaust gas driven turbine wheel thereby drives the compressor impeller to compress charge air for supply to the intake of the engine, all in a well known manner.

The rotating shaft in a turbocharger is subject to being driven at relatively high rotational speeds, such as on the order of about 100,000 rpm. or more. Such rotational speeds require the use of precision bearing components together with an effective system of bearing lubrication. In this regard, lubricating oil is commonly pumped under pressure to the turbocharger center housing for supply therethrough to lubricate the shaft bearings to prevent excessive bearing heating and wear.

When operating at a high rotational speed, some turbochargers emit an audible whine or noise objectionable to some consumers. This is particularly true when the turbocharger is used in a domestic vehicle wherein the engine is designed for relatively quiet operation. This noise occurs primarily as a result of high frequency radial shaft excursion caused by imbalanced rotating components. It is desirable, therefore, to provide an improved turbocharger bearing design for reducing radial shaft motion at high speeds.

Turbocharger bearings in the prior art typically comprise a plain-type floating sleeve bearing having a circular cross-section for reception over the shaft of the turbocharger with limited clearance. During operation of the turbocharger, the turbocharger shaft rotates within the bearing, and the bearing sleeve rotates or floats within the turbocharger center housing at a rotational speed somewhat less than the turbocharger shaft speed, depending upon the inner and outer diameter bearing clearances. See, for example, U.S. Pat. Nos. 3,993,370 and 4,009,972. Other bearings have been proposed which attempt to improve lubrication between the shaft and the bearing by providing an enlarged radius over a portion of the bearing inner diameter for reception of lubricating oil. During operation, the rotating shaft tends to draw oil from the enlarged radius, and to pump that into the smaller clearances between the shaft and bearing. See, for example, U.S. Pat. Nos. 3,058,787 and 4,037,889. However, none of these prior art sleeve bearings have been found to be satisfactory in controlling or reducing high speed noise in automobile turbochargers.

A variety of sleeve-type bearing designs are available in the general prior art for limiting radial excursions of a high speed rotating shaft. One design approach comprises the provision of a plurality of arcuate ramps about the inner diameter of the sleeve bearing, wherein oil is supplied between the shaft and the bearing at or near the base of each ramp. See, for example, U.S. Pat. Nos. 1,495,660, 2,134,621, 3,680,932 and 3,722,965. Another design approach has been to provide a plurality of steps or lands formed on a common radius and separated by axially extending oil supply grooves. See, for example, U.S. Pat. Nos. 421,089, 1,376,094, 1,397,050, 3,167,362 and 3,941,437. However, many of these various bearing designs are limited to use with a shaft rotating only in a single direction. Accordingly, these bearings cannot be reverse mounted in a turbocharger center housing, and thus are compatable with modern turbocharger high production rate manufacturing criteria. Others of these bearing designs are bi-directional, but they have been found to be unsatisfactory in preventing shaft excursions to reduce generated noise in high speed turbochargers.

The present invention overcomes the problems and disadvantages of the prior art by providing an improved floating sleeve bearing specifically designed for use in high speed turbochargers for limiting radial shaft excursions, and thereby also for limiting generated noise.

SUMMARY OF THE INVENTION

In accordance with the invention, a sleeve-type bearing is mounted within a turbocharger center housing and about a rotating turbocharger shaft for rotational floating of the bearing within the center housing upon shaft rotation. The center housing includes appropriate passages for supply of lubricating oil to and through the sleeve bearing for preventing excessive bearing heating and wear. Importantly, this lubricating oil is supplied to a groove in the center housing circumferentially surrounding the sleeve bearing in axial alignment with a plurality of radially formed oil supply holes in the bearing. The radial oil holes admit oil from the housing groove to lubricate the interface between the shaft and the bearing inner diameter.

The inner diameter of the sleeve bearing is defined by a plurality of arcuate recesses formed on a common radius and each extending axially the length of the bearing. Each recess is formed in alignment with a respective one of the radial oil supply holes for receiving a supply of oil centrally within its arcuate width. The recesses are separated by a corresponding plurality of shaft-supporting lands which also extend axially the length of the bearing. The recesses and lands are sized with respect to each other such that the ratio of the arcuate widths of the recesses is on the order of about three times the arcuate widths of the lands.

BRIEF DESCRIPTION OF THE DRAWINGS

The accompanying drawings illustrate the invention. In such drawings.

DESCRIPTION OF THE PREFERRED EMBODIMENT

Figure 1:
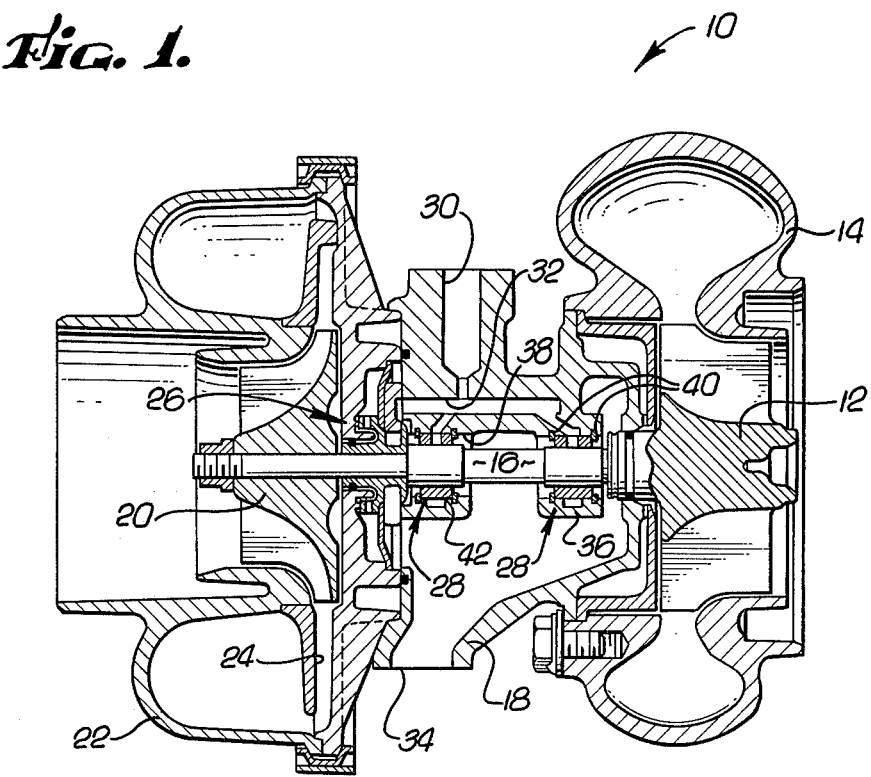
FIG. 1 is a vertical section of a turbocharger including a pair of floating sleeve bearings of this invention.

A turbocharger 10 is shown in FIG. 1, and comprises a turbine 12 carried in a turbine housing 14 upon a rotatable shaft 16. The shaft 16 extends from the turbine housing 14 through a center housing 18, and has its opposite end connected to a compressor impeller 20 received in a compressor housing 22. In operation, exhaust gases from a combustion engine (not shown) are supplied through the turbine housing 14 to rotatably drive the turbine 12. Such rotatable driving of the turbine 12 correspondingly rotates the shaft 16 and thus also rotatably drives the compressor impeller 20. The compressor impeller 20 draws in ambient air, and compresses the air for supply through a diffuser 24 and further through the compressor housing 22 to the air intake of the combustion engine, all in a well known manner.

The center housing 18 is suitably secured between the turbine housing 14 and the compressor housing 22, and includes support structure for supportably carrying a thrust bearing assembly 26 and a pair of sleeve-type journal bearings 28. More specifically, the thrust bearing assembly 26 is positioned at one end of the shaft 16 with the center housing 18, such as the end adjacent the compressor impeller 20. This thrust bearing assembly 26 functions upon shaft rotation to limit axial excursions of the shaft 16, and thereby to locate accurately the turbine 12 and the compressor impeller 20 within their respective housings 14 and 22. While a variety of specific thrust bearing assembly configurations are possible, a preferred assembly is shown and described in U.S. Pat. No. 4,157,834. Importantly, as shown, lubricating oil is supplied to the thrust bearing assembly 26 via a center housing oil inlet 30 and internal oil feed passages 32. Oil circulated through the thrust bearing assembly 26 ultimately drains to a sump passage 34 for subsequent recirculation, as is known in the art.

The center housing 18 includes a pair of axially spaced bearing bosses 36 disposed generally at opposite ends of the shaft 16 within the center housing. Each of these bearing bosses includes a bearing bore 38 for reception of one of the floating sleeve bearings 28. Each of these sleeve bearings 28 is axially constrained by a pair of retainer rings 40 in an axial position centrally with respect to a circumferentially extending oil feed groove 42 formed directly in the boss 36 in communication with the internal oil feed passages 32.

Figure 2:
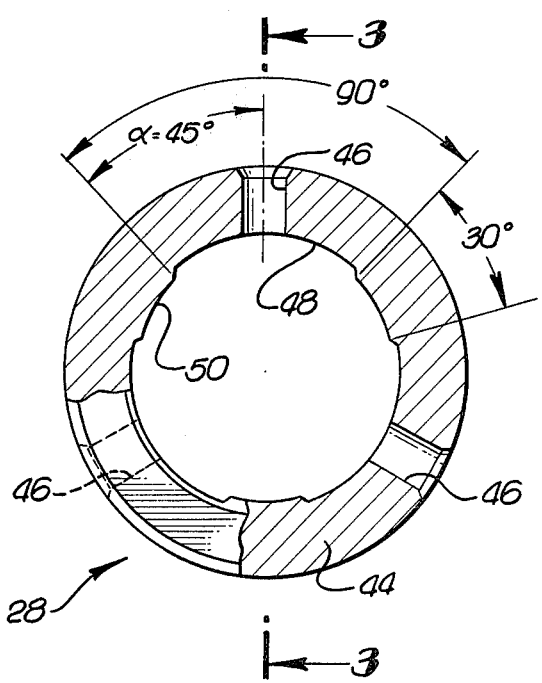
FIG. 2 is an enlarged end view of a floating sleeve bearing, with portions broken away.
Figure 3:
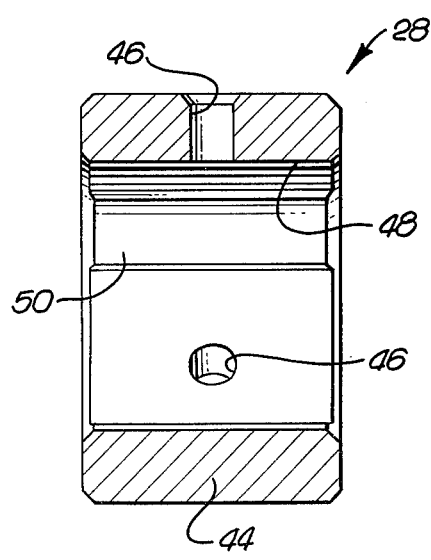
FIG. 3 is a vertical section taken on the line 3—3 of FIG. 2.

The two sleeve bearings 28 are identical in construction to each other, with one of said bearings 28 being shown in detail in FIGS. 2 and 3. As shown, the bearing 28 comprises a cylindrical sleeve 44 having a circular outer diameter sized for close, rotational floating within the associated bearing bore 38. The sleeve 44 includes a plurality of radially formed oil feed holes 46. These oil feed holes are formed at equal angular intervals about the circumference of the sleeve 44, and centrally with respect to the axial length of the sleeve in substantial alignment with the circumferential, radially inwardly open oil feed groove 42 within the bearing boss 36. As shown in the drawings, three oil feed holes 46 are formed generally at 120 degree intervals about the circumference of the sleeve 44.

Each of the oil feed holes 46 opens centrally into the arcuate width of an oil-receiving recess 48 formed generally at the inner diameter of the sleeve 44. More specifically, a plurality of arcuate recesses are formed each having the same arcuate width and arranged at equal angular intervals about the inside diameter of the sleeve. Each recess 48 extends the axial length of the sleeve, and corresponds with one of the oil feed holes 46 for receiving lubricating oil centrally within the recess 48.

The recesses 48 are separated by a corresponding plurality of arcuately-formed lands 50. These lands 50 also extend the radial length of the sleeve 44, and are formed on common radius. The radius upon which the lands 50 are formed is chosen to be slightly greater than the radius of the turbocharger shaft 16 to provide the desired oil film clearance between the lands 50 and the shaft 16, and slightly less than that of the recesses 48. For example, in one embodiment of the invention, the radial difference between the lands 50 and the recesses 48 was chosen to be about 0.001 inch.

The film clearances between the outer diameter of the sleeve 44 and the center housing 18, and between the lands 50 and the turbocharger shaft 6 are carefully chosen to optimize floating of the sleeve 44 and retention of the shaft 16 against radial excursions. More specifically, the ratio of the outer diameter film thickness or clearance to the inner diameter film thickness or clearance is chosen to be about 2 to 1. For example, in one embodiment of the invention using a shaft 16 with a 0.4 inch diameter, the outer diameter clearance was chosen to be about 0.0025 inch and the inner diameter clearance was chosen to about 0.0013 inch.

The relative arcuate dimensions of the recesses 48 and lands 50 are specifically chosen to reduce substantially noise-producing vibrations occurring as a result of radial shaft excursions during relatively high speed operation of a turbocharger. More specifically, it has been found that objectionable noise in automobile turbochargers commonly occurs as a result of radial shaft excursion particularly through the range of from about 40,000 rpm to about 80,000 rpm. The relative dimensions of the recesses 48 and the lands 50 of the floating sleeve bearing 28 of this invention are chosen to provide a bearing structure for rotatably supporting the turbocharger shaft 16 to prevent such undesirable radial shaft excursions, and thereby also substantially eliminate vibratory noise resulting therefrom. More particularly, the ratio of the arcuate dimension of each recess 48 with respect to the arcuate dimension of each land 50 is on the order of about 3 to 1, and preferably within the range from about 1 to 1 to about 3 to 1. Thus, as illustrated in FIG. 2, each recess 48 extends through an arcuate dimension of about 90 degrees, whereas each land 50 separating a pair of the recesses 48 extends through an arcuate dimension of about 30 degrees.

In operation of the turbocharger, oil is supplied through the center housing oil inlet 30 and the internal feed passages 32 to the circumferential groove 42 within the bearing bore 38. This oil is thus communicated directly to the outer diameter of the bearing between the sleeve 44 and the bearing boss 36 by means of the groove 42. Oil is further communicated through the radial oil feed holes 46 centrally to the recesses 48 between the sleeve 44 and the shaft 16. As the shaft 16 rotates with respect to the sleeve 44, the shaft carries the oil out of the recesses 48 and squeezes the oil between the shaft and the lands 50 to create a squeeze-film lubricating effect. Importantly, the oil feed holes 46 are centrally located both with respect to the arcuate widths and the axial lengths of the recesses 48 so that the sleeve 44 may be mounted within the appropriate bearing boss 36 in either direction with bearing performances being unaffected by the direction of shaft rotation.

The floating sleeve bearing for use in a turbocharger as described herein has been found to be effective to reduce vibratory noise in turbochargers. Moreover, this particular sleeve bearing design has been found to reduce bearing wear between the shaft and the sleeve bearing resulting from abrasive contact by the bearing with particulate commonly found in automobile lubricating oil. The recesses 48 have sufficient arcuate length such that abrasive particles tend to flow axially out of the recesses 48 away from the lands 50. In this manner, abrasive wear between the lands 50 and the shaft 16 is reduced. Moreover, larger particulate in the incoming oil supplied to the housing groove 42 is centrifuged by virtue of rotational motion of the floating sleeves whereby such larger particulate remains in the groove 42 without becoming trapped between the outer diameter of the sleeve and the bearing boss 36.

The floating sleeve bearing of this invention is quickly and inexpensively formed by a variety of manufacturing techniques such as broaching, machining, or powder metallurgy. If desired, the bearing lands and recesses can be formed between annular end walls having uniform inner diameters received about the shaft. Moreover, the bearing is symmetric or bidirectional, and thus can be mounted in either direction within a turbocharger bearing boss without affecting performance of the bearing or the turbocharger. Still further, the bearing design is applicable for use with a wide variety of bearing materials such as, for example, leaded bronze, unleaded bronze, aluminum, etc.

A variety of modifications and improvements to the floating sleeve bearing disclosed herein are believed to be possible within the skill of the art. Accordingly, no limitation upon the invention is intended by way of the above description except as set forth in the appended claims.

I claim:

1. A rotationally floating shaft bearing for use in a turbocharger, comprising a generally cylindrical unitary sleeve having a generally circular outer diameter, and an inner diameter defining at least three equiangularly arranged and substantially identical arcuate lands formed on a common radius and separated by a corresponding plurality of substantially identical arcuate recesses formed on a common radius slightly greater than the radius of said lands, said lands and recesses being formed on a common center and extending axially the length of said sleeve, said recesses having a total arcuate width of from about one to about three times the total arcuate width of said lands, and said sleeve having formed therein a plurality of radially extending holes in alignment centrally with respect to the arcuate widths of respective ones of said recesses for communicating lubricating oil centrally into said recesses.

2. A turbocharger shaft bearing as set forth in claim 1 wherein said plurality of lands comprises three substantially identical lands arranged at equal angles about the inner diameter of said sleeve, said plurality of recesses comprising three substantially identical recesses arranged at equal angles about the inner diameter of said sleeve and each separating an adjacent pair of said lands.

3. A turbocharger shaft bearing as set forth in claim 2 wherein said lands each have an arcuate width of about thirty degrees, and said recesses each having an arcuate width of about ninety degrees.

4. In a turbocharger having a turbocharger center housing with a bearing bore formed therein, and a rotatable shaft received axially through said bearing bore, a turbocharger shaft bearing, comprising a generally cylindrical floating unitary sleeve received into said bearing bore for rotation with respect to said bearing bore and for receiving said shaft therethrough, said sleeve having a generally circular outer diameter and an inner diameter defining an equiangularly arranged plurality of at least three substantially identical arcuate lands formed on a common radius for rotatably supporting said shaft, said lands being separated by a corresponding number of substantially identical arcuate recesses formed on a common radius slightly greater than the radius of said lands, said lands and recesses extending the axial length of said sleeve and sharing a common centerline with said bearing bore, said recesses having a total arcuate width of about three times the total arcuate width of said lands, and said sleeve having formed therein a plurality of radially extending holes in alignment centrally with respect to the arcuate widths of respective ones of said recesses for communicating lubricating oil into said recesses.

5. A turbocharger shaft bearing as set forth in claim 4 wherein said housing has formed in said bearing bore a circumferential oil feed groove about said sleeve in axial alignment with said radially extending holes, said housing including passage means formed therein for communicating a supply of lubricating oil to said groove.

6. A turbocharger shaft bearing as set forth in claim 4 wherein each of said radially extending holes is formed centrally with respect to the arcuate width and the axial length of the associated recess.

7. A turbocharger shaft bearing as set forth in claim 4 wherein said plurality of lands comprises three lands each having an arcuate width of about thirty degrees, and said plurality of recesses comprises three recesses each having an arcuate width of about ninety degrees.

8. A turbocharger shaft bearing as set forth in claim 4 wherein said sleeve is sized to have a radial outer diameter clearance of about two times the radial inner diameter clearance for rotational floating of said sleeve with respect to said housing and said shaft.

9. In a turbocharger having a turbocharger center housing with a bearing bore formed therein, and a rotatable shaft received axially through the bearing bore, a method of supporting the shaft against radial excursions at relatively high speed shaft rotation, comprising the steps of mounting a unitary bearing sleeve within the bore for reception of the shaft and for rotational floating with respect to the housing and the shaft; configuring the sleeve outer diameter to define a generally circular profile; configuring the sleeve inner diameter to define an eqiangularly arranged plurality of at least three substantially identical arcuate lands extending the axial length of the sleeve and formed on a common center for rotatably supporting the shaft, and a corresponding plurality of substantially identical arcuate recesses extending the axial length of the sleeve and separating the lands and formed on a common radius slightly greater than the radius of the lands, wherein the arcuate width of the recesses is from about one to about three times the arcuate width of the lands; forming in the sleeve a plurality of radially extending holes in alignment centrally with the arcuate widths of respective ones of the recesses; and supplying lubricating oil through passage means in the housing to the sleeve for passage through the holes centrally into the recesses.

10. The method of claim 9 including forming in the housing a circumferential groove about the sleeve in substantial axial alignment with the radial holes; and slinging particulate in the lubricating oil radially outwardly into the groove away from the sleeve upon rotational floating of the sleeve.

11. In a turbocharger having a turbocharger center housing with a bearing bore formed therein, and a rotatable shaft axially received through the bearing bore, a method of supporting the shaft against radial excursions at relatively high speed shaft rotation, comprising the steps of mounting a bearing sleeve within the bore for reception of the shaft with an outer diameter clearance approximately twice the inner diameter clearance for rotational floating of the sleeve with respect to the housing and the shaft; configuring the sleeve outer diameter to have a generally circular profile; configuring the sleeve inner diameter to define a plurality of at least three arcuate lands extending the axial length of the sleeve and formed on a common center for rotatably supporting the shaft, and a corresponding plurality of arcuate recesses extending the axial length of the sleeve and separating the lands and formed on a common radius slightly greater than the radius of the lands, wherein the arcuate width of the recesses is from about one time to about three times the arcuate width of the lands; forming in the sleeve a plurality of radially extending holes in alignment centrally with the arcuate width and axial lengths of respective ones of the recesses; forming a circumferential groove about the sleeve in substantial axial alignment with the radial holes; supplying lubricating oil through passage means in the housing to the sleeve via the groove for passage through the holes centrally into the recesses; and slinging particulate in the lubricating oil radially outwardly into the groove away from the sleeve upon rotational floating of the sleeve.

* * * * *